THERMOMAGNETIC RECORDING METHOD AND SYSTEM

Filed June 13, 1968

2 Sheets-Sheet 1

INVENTORS:
Stanton H. Cushner
Alan S. Hoffman
By Smyth, Roston & Pavitt
ATTORNEYS

THERMOMAGNETIC RECORDING METHOD AND SYSTEM

INVENTORS:
Stanton H. Cushner
Alan S. Hoffman

By Smyth, Roston & Pavitt
ATTORNEYS

United States Patent Office 3,562,760
Patented Feb. 9, 1971

3,562,760
THERMOMAGNETIC RECORDING METHOD AND SYSTEM

Stanton H. Cushner and Alan S. Hoffman, Los Angeles, Calif., assignors to The Magnavox Company, Torrance, Calif., a corporation of Delaware
Filed June 13, 1968, Ser. No. 736,697
Int. Cl. G01d *15/12;* G11b *7/00*
U.S. Cl. 346—74 13 Claims

ABSTRACT OF THE DISCLOSURE

Magnetic layers comprising particles having several differently oriented easy axes of magnetization and dispersed in the layers at random, are used for providing magnetic recordings using magnetic bias, local thermal treatment and below room temperature coercivity fields for changing the magnetization in locally heated areas. Particularly Co—$\gamma$—$Fe_2O_3$ is suggested to obtain a thermomagnetic recording through the combination of magnetizing field and information modulated thermal treatment at temperatures well below the Curie point.

The present invention relates to a new magnetic recording method and system. The conventional way of providing magnetic recording uses the principle of electromagnetism. A transducer is juxtaposed to a magnetizable surface to provide thereto a permanent magnetization. A portion of the storage carrier closes a magnetic flux path of the transducer, requiring transducer and carrier to be in close proximity to prevent or reduce flux leakage. As carrier and transducer move relative to each other, the carrier becomes spatially variably magnetized along the direction of motion, and corresponding to variations of an electrical signal driving the transducer. The limitations of this method are evident. Transducer and moving storage area may make physical contact and, therefore, produce abrasion. Any such contact is permissible only when the carrier is a flexible tape. If the magnetizable surface pertains to a hard surface carrier, such as a magnetic disk or drum, the transducer has to be maintained in spaced relationship above the moving surface, which reduces the efficiency of recording, as well as the resolution of the recorded information.

For a contactless recording, it has been suggested to employ a special type of magnetizable storage carrier, such as a magnetic tape, having a layer with chromium dioxide particles. This material, depending on additives and treatment, has a very low Curie point, such as below 200° C., even below 100° C. The tape is, for example, provided with initial biasing or premagnetization. For recording, the tape is subjected to localized radiation for heating elemental portions of the tape above the Curie point. As the material becomes paramagnetic, the initial magnetization of any portion thus treated is destroyed, while adjacent portions which remained below the Curie point retained their magnetism. The destroyed magnetization is preferably substituted by a differently directed magnetization derived from a noncontacting, large scale, noninformation providing magnet or transducer; particularly the paramagnetic portions of the tape are permitted to revert to the ferromagnetic state under the influence of this second field. The substitute magnetization has below room temperature coercivity which still suffices to permanently magnetize those tape portions reverting to the ferromagnetic state without affecting the other portions of the tape which remained ferromagnetic.

This method of recording by means of a combination of radiation and remagnetization can, of course, be employed with any ferromagnetic material, even one of a relatively higher Curie point. However, there arises one, possibly two, problems, because the radiant energies then needed are correspondingly higher. First, the backing member for the magnetic layer must withstand the elevated temperature. For plastic tape, this precludes utilization of high Curie point material; conventional Mylar tape will decompose at about 170° C. Second, the radiation may be modulated, by a photographic transparency, film or the like. Radiation is absorbed and converted into thermal energy in portions of the photographic image which are opaque within the photographic layer. Thus, the radiation needed for the thermomagnetic process must not exceed an intensity which may destroy the transparency. These problems all but preclude utilization of iron oxide-type tapes and others.

The invention now relates particularly to a system and method, according to which the Curie point does not have to be exceeded for providing a thermomagnetic-type recording. The Curie point of the magnetizable carrier to be used is quite irrelevant and can be high. Thermomagnetic recording through localized heating is possible if the recording material has temperature dependent magnetization anisotropy of its crystal structure due to a plurality of transversely oriented "easy axes" of magnetization of a magnetic domain. The material should have sufficiently high remanence, of at least several hundred gauss. The magnetic layer should be constituted by individual particles having little magnetic interaction. If the coercivity of the material is generally high, so as to classify the material as magnetically "hard," this lack of interaction can be expected. Such a material can be expected to have a temperature dependent coercivity well below the Curie point and in a range where the remanence is only little affected by the thermal treatment.

It has been found that $Fe_2O_3$ crystals which are heavily doped with cobalt, for example, in the range of 10 to 20% have a cubic crystal structure with several transversely oriented axes of easy magnetization. There are altogether six axes, paired in opposite directions, and the three pairs are transversely oriented to each other. The magnetic anisotropy, i.e., the relative location of any easy axis in a particle depends upon the crystal structure and not upon its shape. The particles are presumed to have the size of a single magnetic domain. Thus, such a magnetized particle may rather readily change the direction of its internal magnetization (switching of axes), spontaneously by an increase in its thermal energy but at temperatures still well below the Curie point. Such change of direction of magnetization in the particle is essentially irreversible after decay of the sufficient thermal energy due to lack of magnetic interaction at lower temperatures. Such a "history" of the particle does not affect the remanent magnetization thereof.

A shape anisotropic particle, such as chromium dioxide, having but two oppositely directed but colinear easy axes of magnetization and being saturatedly magnetized in one axis, can spontaneously switch the direction of magnetization (to the respective opposite one) due to an increase in internal thermal energy in the vicinity of the Curie point only, and it will not necessarily return to saturation magnetization after decay of the thermal energy.

If a plurality of anisotropic crystal particles (such as Co—$\gamma Fe_2O_3$) are arranged so that their axes are oriented at random, then the plurality will appear externally as being demagnetized particularly if the magnetization of each particle is likewise at random, even though each particle is magnetized at saturation along one of its axes.

As the plurality of particles is magnetized by a uniform magnetic field, each particle is magnetized along that one of its axes closest to the direction of the applied field. Thermal energy i.e., oscillations within the crystal lattice structure always will cause some of the crystals to switch magnetization from one to another axis and this is noticed macroscopically as demagnetization. However, for $$Co—\gamma Fe_2O_3$$

this is a negligible effect at room temperature.

Upon heating the particles and eventually upon applying concurrently a differently oriented magnetic field of below room temperature coercivity to the particles, the probability of a switching in axes for each particle increases. This being a statistical phenomenon there being little or no interaction between the particles. Thus, partial or complete randomization of the magnetization and along the several axes can be controlled. The randomization being essentially spontaneous because of an increase in internal energy, while the weak auxiliary field increases the probability of such switching of axes, even when the field is too weak to force the magnetization of the affected crystals into alignment.

Aside from the spontaneous switching of axes, particles of $CO—\gamma Fe_2O_3$ will more easily switch their magnetization to an alignment or near alignment with an external field at higher than at lower temperatures. Thus, this material, in general, has a very high degree of temperature dependency of its coercivity in a range which includes the room temperature. The coercivity drops from the value of 600–800 oersteds, at room temperature, to 200 oersteds or below for the temperature decompositioning of a tape, such as traded under the trade name Mylar (about 170° C.). Thus, a tape having such cobalt-doped $Fe_2O_3$ particles as magnetic layer, requires heating to a temperature safely below the temperature of destruction of such tape to obtain, for example, a 2:1 coercivity drop. It was found that in that range, below the temperature of destruction of the tape, the remanence changes only insignificantly. The Curie point of the material is very high, about 380°.

As a consequence, a recording can be obtained by premagnetizing the magnetic tape, heating it locally by means of radiant energy to a temperature above the room temperature but well below the temperature of the decomposition temperature of the tape, particularly of its backing member, and remagnetizing the thus heated portion by a field having a strength which is below room temperature coercivity. The portions of the magnetic tape which remain at room temperature or are heated only slightly above that temperature, are not or only little affected by the magnetic field applied concurrently with the heating.

The substitute magnetic field in particular has a strength equivalent to a coercivity of the material at a temperature within the operating range. Where that temperature is exceeded, the tape becomes remagnetized essentially at saturation in direction of the substitute field. At no time, of course, does the material revert to the paramagnetic state anywhere as the Curie point is well above operating temperature. The heated and remagnetized tape portion, after having cooled down to room temperature, has still saturation magnetization, but the direction of the magnetization, where the magnetic field was applied to the heated portion, is different from the direction of the premagnetization, thus defining a magnetic or magnetization contrast.

The tape used as record carrier, preferably, has such magnetizable particles dispersed in a binder, the particles being of a size approximately equal to the size of a single magnetic domain. As stated, the particles have single, crystal structure, with several different oriented easy axes of magnetization; i.e., they are magnetically anisotropic and the anisotropy is temperature dependent. If the temperature dependency of coercivity is used, as control criterium, with information being recorded to result in saturation magnetization in but one of two directions at any location, then the particles can be (physically) preoriented in the layer so that one of their axes coincides with one direction of desired magnetization.

If the particles are dispersed in the binder with random distribution of the easy axes, the magnetic layer has no macroscopic easy axis of magnetization. Premagnetization causes each particle to magnetize along that one of its easy axes having the smallest angle to the applied field. After the premagnetizing field has been removed, and thermal energy is subsequently absorbed by the particle, a spontaneous shift or switch in the direction of magnetization becomes more probable, thus causing local, macroscopic demagnetization; this can be aided by a weak demagnetizing field, as stated.

The controlled, macroscopic demagnetization depends, for a given, uniform demagnetizing field, on the local intensity of the heating. The local heating intensity can be controlled, for example, by flashing light onto the carrier through a photographic transparency. The presence of a weak magnetic field increases the probability even at overall low radiation intensities that some of the particles switch axes towards that field, so that partial demagnetization, or even incomplete remagnetization is obtained in dependence upon the local radiation intensity, producing spontaneous switching of axis at temperature dependent probability, aided by a weak field. As the thermal energy decays, probability of switching decreases and the locally variable new orientation of magnetization remains, particularly for lack of interaction among the several particles. This way a gray scale recording is readily obtainable, with half tones resulting from partial, macroscopic demagnetization or incomplete remagnetization. In other words, the macroscopic remanent magnetization varies steadily from complete saturation in one direction, complete saturation in the opposite direction, with lower magnetization values in between corresponding to a half tone scale of gray tones in the photographic transparency through which the carrier was flash heated.

While the specification concludes with claims particularly pointing out and distinctly claiming the subject matter which is regarded as the invention, it is believed that the invention, the objects and features of the invention and further objects, features, and advantages thereof will be better understood from the following description taken in connection with the accompanying drawings, in which:

FIG. 1 is a schematic side view of a recording device in accordance with the present invention;

FIG. 1*a* is a cross section through a tape reeled through the recording station of FIG. 1;

Figure 1:
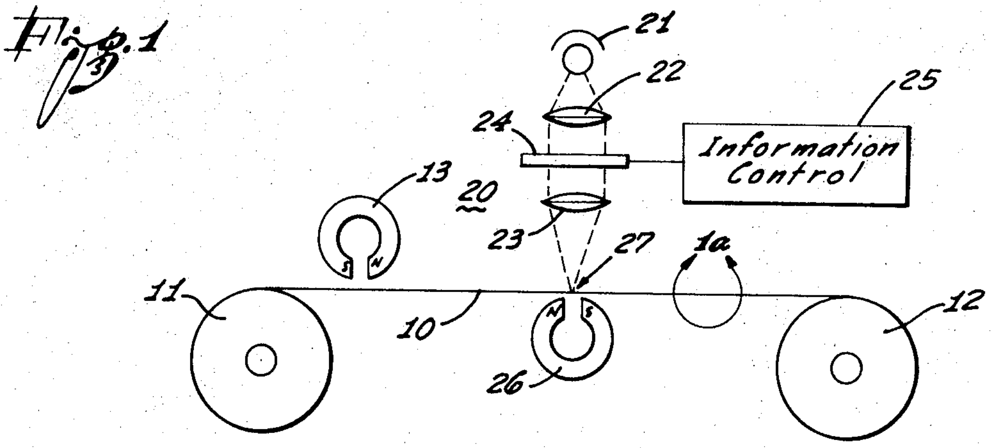
Figure 1A:
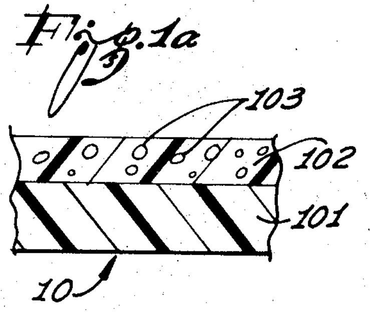

An example for an apparatus with which the inventive system can be practiced is illustrated in FIG. 1. A magnetizable tape 10 is reeled, for example, from a payout reel 11 past a strong magnet 13, traverses a recording station 20, and wound upon a takeup reel 12. The magnet 13 provides to the tape a longitudinal, uniform magnetization at saturation. The tape 10 (FIG. 1*a*) is preferably comprised of a Mylar backing member 101 carrying a layer 102 of a binder, such as an epoxy binder in which are embedded particles 103 of cobalt substitute iron oxide ($Co—\gamma Fe_2O_3$). The particles 103 have preferably dimensions of a single magnetic domain.

The recording station 20 is provided for single track recording, presently presumed for reasons of simplicity; a more sophisticated recording method will be discussed more fully below. The recording station 20 has a suitable light source 21, preferably a high intensity lamp or a laser. A spot is focused by means of an optical system 22 and 23 in the plane through which the tape 10 passes when traversing the recording station.

The light beam is subjected to intensity modulation, for example, through a light valve 24 which may be of conventional construction and of the type which permits a controlled degree of transparency, the control to be obtained through electrical signals. These electrical signals are derived from an information source and control stage 25. Stage 25 may be a source of video facsimile or audio signals or a source of digital information having alpha numerical or control significance. In any event, the information signal is presumed to be expressible as variable amplitude and/or frequency. Preferably, the signal controlling light valve 24 is a frequency-modulated carrier.

Irrespective of the format of the signals, the intensity of the light spot as focused by the optical system in the plane of and onto the magnetic tape 10 varies in accordance with the information signal. The intensity of the focused light spot thus determines the amount of radiant energy received by an elemental portion of the tape at any instant. As a particular portion of the light is absorbed by the tape, its local temperature is raised.

Underneath the area on which the light spot is focused there is provided a second magnet 26, which provides a particular magnetization of a strength to be discussed more fully below. Suffice it to say presently that magnet 26 provides a magnetic field which is below room temperature coercivity of the magnetic tape passing through the recording station. The direction of the applied magnetization is opposite to the magnetization which was produced by magnet 13. The recording proper results from interaction as between local heating by the focused spot of radiant energy and the weak magnetization concurrently applied.

Utilization of both premagnetization of the tape and a source of a magnetic field in the recording station is not essential in principle, but preferred. Both types of magnetizations are presently presumed and deviations from this arrangement will be discussed below. The magnet 13 can be a portion of the recording station, but the tape on reel 11 may already be premagnetized, so that magnet 13 is not required right at the station. However, for reasons of noise suppression, it may be advantageous to premagnetize the tape just ahead of recording.

Figure 2:
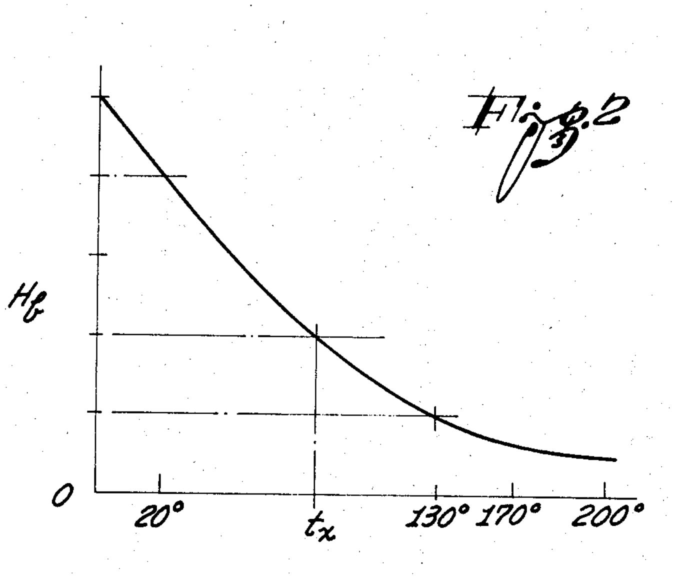
FIG. 2 is a plot showing representatively the temperature dependency of the coercivity of cobalt-doped iron oxide.
Figure 3:
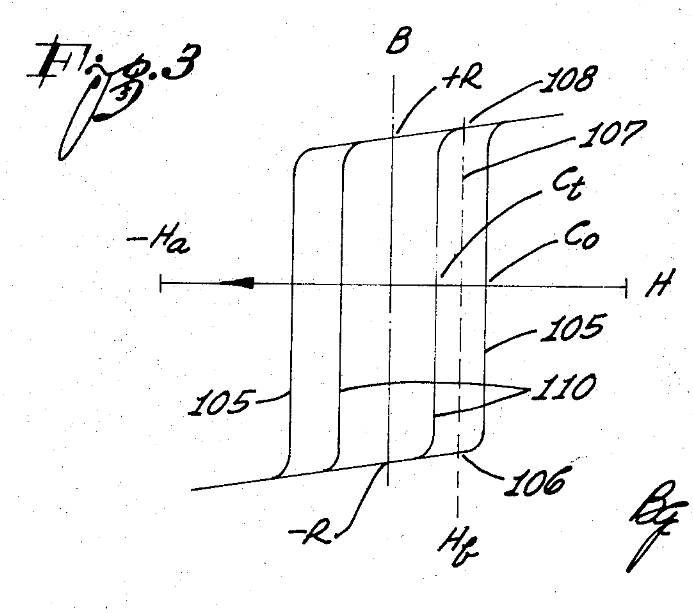
FIG. 3 is a plot showing the temperature dependency of the hysteresis loop of the material.

Specifics of the recording process will be understood best with reference to FIGS. 2 and 3. The material suggested here as magnetization storage carrier is characterized more generally by a rather strong temperature dependency of its coercivity. Coercivity is representatively plotted vs. temperature in FIG. 2. The trace is representative only as the particular relationship between coercivity and temperature depends on the proportions of cobalt to iron, the size of the particles 103, their density in the layer 102, i.e., within the binder, etc. The trace is representative of a layer having particle size of a single magnetic domain, with 10 to 20% cobalt substitution for iron in the $Fe_2O_3$ particles used as magnetizable material.

The plot of FIG. 2 extends approximately from 0° C. to about 200° C. The coercivity still increases at lower temperatures, so that appropriate cooling increases the available range for the coercivity drop. The trace continues to the right, up to the Curie point of the material, which is rather high; it is in the neighborhood of 380°. The coercivity has, of course, no meaning at the Curie point.

There is no inherent necessity of employing a Mylar backing member for the recording tape, nor does the record have to be a tape. However, magnetic tapes are practical for many reasons and the backing member of the tape has to have suitable mechanical properties such as flexibility, sufficient tear strength, etc. Plastic tapes are more suitable for this purpose, and polyester is the most commonly used material.

Backing members, particularly, for example, Mylar tape, have a temperature of chemical decomposition of about 170° C. It is thus essential that the tape never be heated close to or even exceed that temperature. On the other hand, it is impractical to consider as a "normal" temperature of such a tape, any temperature different from room temperature. It follows that an operating range has to be defined to extend from room temperature to a temperature safely below the "temperature of destruction" of the carrier, particularly of the binder and/or of the backing member, whichever is lower. As the temperature dependence of coercivity is the principal phenomenon utilized presently, the operating temperature range should be as large as possible to benefit from a corresponding large change in coercivity.

A temperature of about 20° C., on one hand, and a "safe" temperature, such as, for example, 130° C., constitutes an operating range, corresponding to a 2:1 change (drop) in coercivity. The lower end of the temperature range may not be exceeded for reasons of practicality, the upper end should not be exceeded in order to safely prevent weakening or even destruction of the tape.

Several magnetic hysteresis loops of the material are illustrated in FIG. 3. Trace 105 defines the hysteresis loop for room temperature, trace 110 is the loop for about 130° C. It is presumed that the tape has been magnetically biased prior to recording by the strong magnetic field $-H_a$ as set up by magnet 13. Any tape increment when leaving the range of magnet 13 has thus obtained a remanent magnetization $-R$. The sign is of no importance and selected completely arbitrary.

If the tape passes through the recording station 20 and light valve 24 is essentially closed, then the remagnetizing field, as provided by magnet 26 and having strength $H_b$, which is below the coercivity $C_o$ of the material at room temperature, shifts the magnetization of the tape to a point 106. As soon as the tape leaves the range of the magnet 26, the magnetization reverses to about $-R$, as that incremental branch of the loop 105 defines essentially a magnetically reversible process. Thus, the initial bias magnetization is retained.

Assuming now that the light valve 24 is opened; the focused light spot heats the portion of the magnetic tape in its range rather instantaneously and over an area essentially as outlined by the dimensions of the focused spot. The focused spot has a gaussian intensity distribution with a flat center peak. The light intensity at fully open light valve and the duration of illumination of any incremental area will be selected to heat the center of that area to about the upper temperature of the operating range.

As the tape moves and the light valve remains open, the resulting constant, high intensity of the light spot will thus "write" a heated line on the tape. The center of that light follows the center of the spot and thus defines the center of the track. The maximum temperature along that center line varies with the light intensity in case the light valve modulates the light beam.

In view of the fact that the layer 102 is rather thin, very little thermal energy is needed to heat a portion of the tape, particularly the magnetic particles 103, for example, up to the maximum operating temperature of 130° or thereabouts. The hysteresis loop contracts to trace 110 and the coercivity of the tape portion thus heated, accordingly, drops from $C_o$ to $C_t$. More specifically, the hysteresis loop of any material contracts to 110 in and along the center line of the track having maximum temperature. More specifically, the hysteresis loop of the material in and along the center line of the track having maximum temperature contracts to 110. As the temperature declines laterally from any point.

Wherever the magnetic field $H_b$, as provided by magnet 26, exceeds the effective coercivity of any heated tape portion, that tape portion is remagnetized to about point 108. In FIG. 2 the temperature $t_x$ identifies that temperature, where the effective coercivity equals the strength of the field provided by magnet 26. Thus, any spot heated to temperature $t_x$ and above, is remagnetized accordingly; any spot remaining below $t_x$ retains its initial magnetization. There is, of course, a small range of temperature values about $t_x$ where the resulting magnetization B is zero. The extent of that temperature range depends on the squareness of the hysteresis loop, and is quite small for the material suggested here.

As soon as the tape recedes from the heating spot, the thermal energy decays in all directions. Concurrently the tape leaves the range of the magnet 26 and the remanent magnetization of any spot which was heated above $t_x$ is about +R, which is essentially the room temperature remanence. Wherever the temperature remained below $t_x$, the magnetization will be about −R. This occurs at sufficient distance from the center track or in case the light valve has closed or not may open.

Upon alternating the light valve 24 between the opened and the closed position, the magnetization of the tape is modulated as it changes between the initial bias or premagnetization at −R and the substitute remanent magnetization +R wherever the tape was heated to the extent that its coercivity dropped below the field as provided by magnet 26. The F-M modulation of the signal controlling the light valve is thus recorded as pattern of alternatingly directed magnetizations on the tape. The boundary zones, where the final, remanent magnetization reverses direction in the material, has dimensions which depend to a considerable extent on the steepness of the lateral intensity drop of the focused spot, and for best results, regions having obtained temperature about $t_x$ should be quite small.

Straightforward analog recording is also obtainable with the new method. The track, as written, is essentially as wide as the temperature distribution exceeds $t_x$ during passage of the light spot over the tape. Modulating the light energy results in a modulation of the track width. When light valve 24 is fully open, a wide track is written; when the light valve is closed so that, for example, just the peak intensity reaches $t_x$, the track is very narrow. Within the track, the resulting magnetization is determined by magnet 26; outside of the track the modulation is determined by the initial, premagnetization. The width variations of the track and thus the contour of boundary line of the track outlines the modulation of the light intensity by the light valve.

The principle of the invention, as explained thus far, rests on the temperature dependency of the coercivity in a range close to the room temperature, and irrespective of the Curie point. The specific material as suggested shows, furthermore, little interaction between the several particles. Thus, there does not have to be any premagnetization. The recording thus could operate solely with the unmodulated magnetic field provided by magnet 26 and cooperating with the light source for interacting in the magnetic layer as described. However, resolution is increased and the noise level is reduced if the tape is premagnetized. That for a premagnetized tape a substitute magnet 26 may not be required will be described later in that specification.

The operating conditions should be discussed quantitatively, considering particularly thermal diffusion. The light valve can be made to change rather rapidly as it is essentially an electronic device. Likewise, the tape will absorb light and thus be heated at a rate determined by the speed of interaction between radiation and molecules. This is a very fast process and can be localized down to molecular dimensions and as focusing permits. However, subsequently thermal decay and heat flow will tend to reduce, even eliminate local temperature differences.

After a quantity of heat has been absorbed in a given volume of magnetic coating, it will spread causing the increase in temperature to spread also. Thus, the maximum temperature of any elemental region is not necessarily determined by the total amount of radiation absorbed when in the range of the focused spot, but heat in-flow from a hotter adjacent portion may temporarily exceed the heat out-flow to raise the temperature further. Assume that all the heat is absorbed (from radiation) at one time, say zero, one can estimate the time constant for such thermal diffusion. Assuming a sinusoidal spatial frequency temperature distribution at time $t_o$, it decays at each position of space to $1/e$ of its initial value with a time constant which is directly proportional to the density of the material and its specific heat and inversely proportional to the product of $4\pi^2$, of the square of the spatial frequency distribution constant of the initial temperature distribution, and of the thermal conductivity per unit area.

Taking typical values for the material chosen and selecting, for example, the spatial frequency constant as $10^4$ per cm., corresponding to a 10 micron spot size, then the decay time is .6 millisecond. Thus, for a desired resolution of about 2500 lines per inch, at a 10 micron spot size, the recording must be carried out in less than .6 millisecond to be discernible. To state it differently, the providing of light energy to each spot where magnet 26 is to reverse its magnetization, must not last beyond .6 millisecond.

In order to obtain an idea of the energy required to decrease the coercivity of the heating to about half its room temperature value, and corresponding to a temperature rise of 100° and thus to be able to "write" thermally as described, it shall be considered representatively that the coating 102 is .01 cm. thick. All numbers should preferably be related to a 1 cm.$^2$ area. The energy required to raise the temperature of any particular quantity of material by a particular temperature differential is proportional to the temperature differential, the volume, the density and the specific heat of that type of material.

Presently the temperature differential is 100° (centigrade). The volume is $1\times0.1$ cm.$^3$; the density is about 5 gms./cm.$^3$, and the specific heat is 0.2 calorie per gram and degree centigrade. The product of these values must be multiplied by the conversion factor $4.2\times10^7$ ergs/cal. The result is $4\times10^7$ ergs, for such a layer region of 1 square cm. and .01 cm. thickness. This amount of energy is to be applied in 0.6 millisecond, and one obtains the requirement for a power density of about $10^{11}$ ergs per cm.$^2$ and sec. Lasers provide unfocused power densities in the range of, for example, from $10^7$ up to $10^{12}$ ergs per square centimeter and second. Through suitable focusing, therefore, power densities well within the requirements are readily obtainable.

The invention has been described in relation to a rather simple embodiment and as a substitute for the conventional electromagnetically operating single track transducer. The resulting recording is a more or less linearly extending pattern of incremental regions where substitute magnetization was provided at saturation level, while there are adjacent regions wherein the premagnetization is retained, also at saturation level and in different direction. Full use not yet been made of all relevant characteristics and properties of that material briefly outlined in the introduction.

Figure 4:
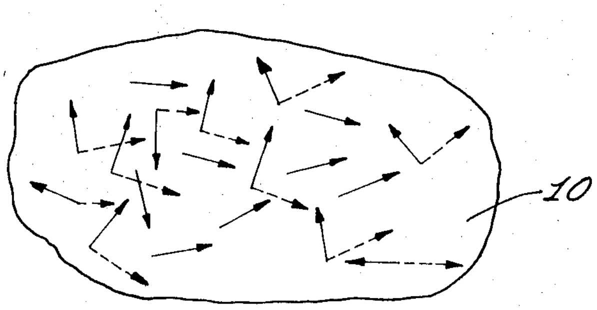
FIG. 4 is a schematic plan view of random magnetization of dispersed magnetizable particles, forming a magnetic layer, illustrating further the effect of an aligning magnetic field.

The particles of the cobalt substitute $Fe_2O_3$ crystals have a cubic crystal structure. Such a crystal has three orthogonally oriented "easy axes" of magnetization corresponding to the three axes of the crystal cube. These cubic crystals are embedded in the layer (binder 102) so that macroscopically the axes are distributed at random. This means that macroscopically the tape does not have any preferred direction of magnetization; the tape permits transverse or longitudinal magnetization, or normal if that were desired, with equally favorable results. In the macroscopical, unmagnetized state the individual crystals are magnetized individually at saturation along one of their respective three "easy axes." As these axes are distributed at random, the magnetization of the plurality of magnetic domains will likewise be distributed at random and the tape appears unmagnetized macroscopically. FIG. 4 can be ragarded as a two dimensional model for such macroscopical, unmagnetic state. The arrows denote actual magnetization of individual magnetic particles being single domains. Moreover, each arrow represents one of the "easy axes" of the respective crystal.

If an external magnetic field $H_a$ of a particular direction is applied to the tape, each magnetic domain will be remagnetized along the easy axis of the domain having the smallest angle in relation to the direction of the magnetic field as applied. The particles will not be magnetized exactly in the direction $H_a$, unless an individual easy axis just happens to coincide with that direction. Thus, the layer will be placed into a state which can be described as near-alignment. The dotted arrows in FIG. 4 denote how the magnetization of a domain, initially having the full-arrow magnetization, will be after a field of direction $H_a$ has been applied. The overall remanence of such a layer will thus be a little below the remanence if all the particles were oriented to have one axis coinciding with the direction of an applied field. Moreover, the coercivity will In view of the anisotropic magnetic characteristics of axes than in case of parallel orientation.

In view of the anisotropic magnetic characteristics of such a magnetic domain, the total energy distribution in the crystal is correspondingly anisotropic with minimum energy required to place the crystal into a magnetic state corresponding to magnetization along any of the easy axes.

As any area of the tape magnetized in this manner is heated to a particular temperature, still well below the Curie point and within the temperature range contemplated here, the individual particle obtains additional energy. The resulting thermal motion of the atoms in the crystal allows the individual particle to spontaneously change the direction of magnetization provided field $H_a$ is not present any more. This is not a microscopic demagnetization (paramagnetism) as it does not (or only to a very small degree) result in a random orientation of the atoms within the ferromagnetic crystal; instead, at an elevated temperature and in the absence of the initial magnetizing field, thermal motion merely facilitates the reorientation of the magnetization of a domain, dipole strength and magnetic moment of the domain remain essentially the same. This reorientation is a matter of probability which increases with temperature and duration of heat application. Thus, upon absorbing thermal energy, some of the domains will switch their axes of magnetization, which amounts to a partial macroscopic demagnetization without Bloch wall shifting of the area so heated. The extent to which particles of a plurality switch their axes depends on the temperature of the plurality obtained and on the time of maintaining the elevated temperature.

Figure 5:
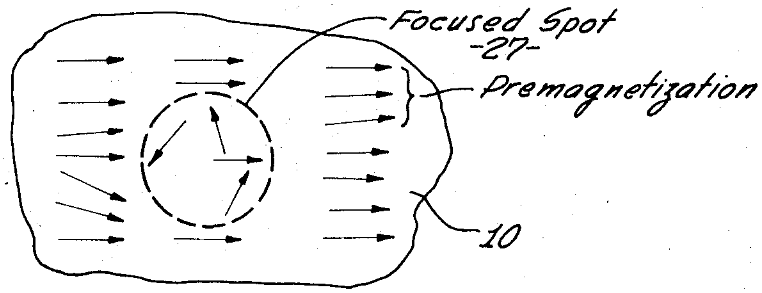
FIG. 5 is a view similar to FIG. 1, and showing a uniformly magnetized layer, but randomized locally by absorption of radiation.

In view of the fact that there is little interaction between the individually embedded domains, the partial or even complete randomization will *persist* after decay of the thermal treatment, even if only a small region has been so treated, which is bounded by regions that remained cool. The lack of magnetic interaction between particles, during and after the thermal treatment, makes it possible that tape regions of microscopically differently oriented magnetizations can exist side by side, resulting in a gradation of externally discernible magnetization. The macroscopically noticeable remanent magnetization is smaller after than before thermal treatment and reflects the partial randomization of the magnetization of the several particles. The thermal treatment will be produced by a beam of radiant energy, the spatial and/or temporal intensity thereof being information modulated. The thermal treatment of a local area is depicted representatively in FIG. 5.

A reversely oriented weak magnetic field of the type discussed above can be used to aid in this demagnetization process, possibly even producing a partial or complete remagnetization (in a different direction) if the temperature is high enough to come within the rules regarding coercivity relation as outlined above. The weak magnetization field as effective during heating should have strength below the coercivity of the heated tape portion except for completely clear image portions. The combined action of demagnetizing field and radiation absorption increases the probability of a spontaneous reorientation of the magnetization, away from the initial magnetization and in a direction closer to the direction of the weak substitute magnetization. A local temperature high enough so that the coercivity equals the demagnetizing field, will be the maximum operating temperatures, as here the particles will be completely remagnetized i.e., 100% spontaneity.

It will be appreciated that randomization without such weak aiding field occurs to a similar degree only at a higher temperature, and after a longer period of heat application. For reasons of avoiding damage to the tape, it is thus advisable to use such an aiding field.

Figure 6:
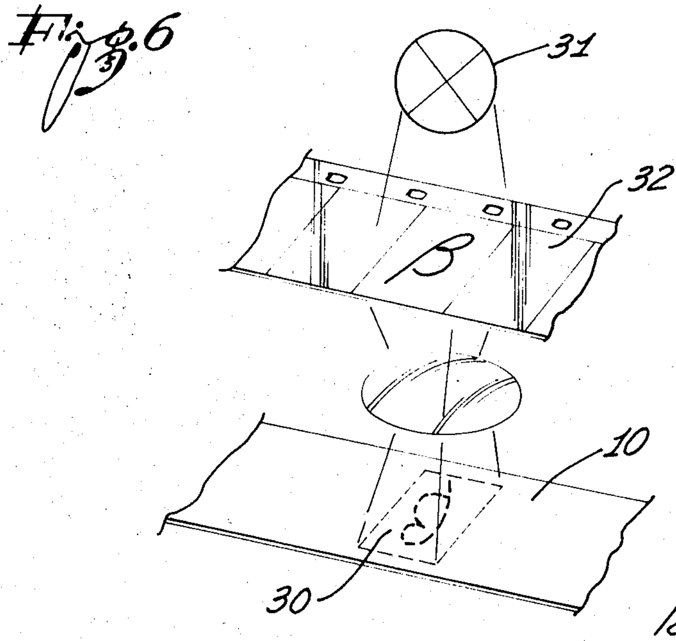
FIG. 6 is a schematic perspective view of a two dimensional, gray scale recording station for practicing the invention.

As a consequence, gray scale recording with half tones is possible as the degree of randomization from an initial premagnetization and the degree of reorientation is a direct function of the thermal energy as locally applied. In other words the temperature dependent probability of causing a local switching of axes in a few, some or many particles can be utilized to obtain gray tone-local magnetization equivalents, particularly if the elevated temperature is maintained only shortly. As soon as the tape has cooled, the new pattern "freezes" and local variations in macroscopically detectible differences of magnetization remains, as the particles do not magnetically interact. Experiments have verified this point. This, in turn, permits two dimensional recording. If, for example, as illustrated in FIG. 6, a particular area 30 of the magnetic layer is illuminated by a lamp 31 through a photographic transparency 32, in that a projecting lens 33 images the illuminated transparency onto the tape, then a uniformy premagnetized tape area will demagnetize locally in accordance with the process as described.

An image portion of the transparency, which is substantially opaque, will effect the initial magnetization not at all or very little. An image portion of the transparency which is substantially transparent will provide sufficient radiation so that the locally reduced coercivity permits the concurrently applied magnetic field to reorient all of the particles so affected to "near-realign" with the substitute field. A middle gray is produced where the reduced illumination in combination with the applied magnetic field completely randomized the so affected tape portion. Darker gray tones produce partial but not complete randomization of the so affected areas, lighter gray tones increase probability that some particles switch axes towards alignment with the substitute field resulting in a gray tone dependent incomplete near-alignment with the substitute field.

It is repeated that the demagnetization involves only the direction of magnetization of any particle, *not* the dipole strength or magnetic moment of the particles themselves. As the several embedded magnetic particles exhibit little interaction, the resolution is determined by the same factors as described above having to do with lateral heat flow from a locally heated region. The interesting aspect of the recording scheme is to be seen in the fact that demagnetization and remagnetization is produced in this manner, well below the Curie point. The material has high remanence within the operating range which, for practical purposes, can be regarded almost as constant. Most importantly, after decay of the thermal energy which resulted from the irradiation, the particles will not or very little change their magnetic orientation. For these reasons, even a slight randomization as produced at elevated temperatures, is readily macroscopically detectible, and well within a resolution $10^2$ lines per mm.

The invention is not limited to the embodiments described above, but all changes and modifications thereof not constituting departures from the spirit and scope of the invention are intended to be covered by the following claims.

We claim:

1. A system for storing information, comprising:

a storage carrier having a plurality of ferromagnetic, essentially noninteracting separated particles with temperature dependent coercivity in a particular range, each particle being magnetically anisotropic in having several transversely oriented axes of preferred magnetization, the particles arranged to have random distribution of their axes;

means for magnetizing the carrier to assume a particular macroscopically organized state of magnetization, wherein each particle is magnetized along the axis having direction closest to the direction of the magnetizing field; and means for providing controlled thermal energy to the carrier to locally heat the carrier, insufficient to demagnetize the individual particles, for causing some of the locally affected particles to switch axes of magnetization to assume at least partially random distribution, the degree of randomization increasing with temperature, a portion of the area receiving the radiation for maximum temperature remaining well below the Curie point and within said range.

2. A system as set forth in claim 1, wherein the means for providing controlled thermal energy include a source of radiant energy and means for modulating the radiant energy to provide different intensities of the radiant energy to the storage carrier.

3. A system as set forth in claim 1, the storage carrier including as particles cobalt-doped iron oxide.

4. A system as set forth in claim 1, including means for providing a below room temperature coercivity field to the carrier concurrently with the providing of thermal energy and having direction different from the magnetization as provided by the means for magnetizing, the field corresponding to the local reduced coercivity of areas of maximum heating of the carrier.

5. A system as set forth in claim 4, the means for providing controlled thermal energy being a two dimensional intensity modulated radiation field.

6. A system for storing information comprising:

a storage carrier having a plurality of magnetizable particles, each having several transversely oriented axes of preferred magnetization due to crystal anisotropy and essentially independent from shape anisotropy;

means for magnetizing the carrier to assume a particular macroscopically organized state of magnetization; and means for providing controlled thermal energy to the carrier to locally heat the carrier insufficient to demagnetize the individual particles, for causing some of the locally affected particles to switch axes of magnetization to assume at least partially random distribution in a portion of the area receiving the radiation.

7. In a system as set forth in claim 6, including means for providing a nonlocalized below room temperature coercivity field to the carrier concurrently with the localized heating and having direction different from the field as provided by the field for magnetizing.

8. A system for providing magnetic recording, comprising:

a magnetic storage surface having a plurality of ferromagnetic particles with temperature dependent coercivity in a temperature range near room temperature and well below the Curie point, the particles further having at least one pair of oppositely directed axes of easy magnetization, the axes of the particles of the plurality being essentially aligned;

means for magnetizing the carrier uniformly along one of said axes of the pair;

means for locally heating the storage surface to a temperature above room temperature, well below the Curie point, and where the coercivity is significantly reduced in relation to the room temperature coercivity; and means for magnetizing the storage surface at a below room temperature coercivity field, the field having direction along the other one of the axes and having strength above the effective coercivity of the storage surface at said temperature as resulting from the local heating.

9. The method of providing a magnetic recording, including the steps of providing a magnetizable storage carrier, having individual ferromagnetic particles of high remanence, the providing step including separation of the particles by a nonmagnetic binder, the ferromagnetic particles selected to have temperature dependent coercivity in a temperature range well below the Curie point, the particles being magnetically anisotropic each having plurality of preferred axes of magnetization, the particles arranged in the binder so that the axes have random relationship;

magnetizing the storage carrier to provide thereto particular uniform magnetization, so that the magnetization of the particles exends along respective axes closest to the direction of the particular field providing the magnetization; and providing localized and locally variable heating to the storage carrier to the extent that some of the particles switch the magnetization to a different axis at random, the probability of switching increasing with temperature in said range, the local variations of heating representing a grey tone scale.

10. The method as set forth in claim 9, including, in addition, providing nonlocalized magnetization concurrently with localized heating and in a direction different from said initial magnetization and at a magnetic field strength corresponding to the reduced coercivity of the particles at points of maximum heating corresponding to brightest increments of an information field to be recorded.

11. The method as in claim 9, the providing step including the dispersion of cobalt doped iron oxide particles in a binder at random distribution of the several transverse axes of easy magnetization thereof.

12. The method as in claim 9, the particle size selected to have predominantly dimensions of a single magnetic domain.

13. The method of providing a magnetic recording including the steps of:

providing a magnetizable storage carrier having individual, ferromagnetic particles of high remanence, the providing step including separation of the particles by a non-magnetic binder, the ferromagnetic particles selected to have temperature dependent coercivity in a temperature range well below the Curie point and to be magnetically anisotropic, in that each particle has a plurality of transversely oriented, preferred axes of magnetization, the particles arranged in the binder pursuant to the providing step so that the axes have random relationship;

magnetizing the storage carrier by a magnetic field along a particular axis and at a field strength below room temperature coercivity of the particles and at a strength corresponding to the relatively reduced coercivity of the particles for a particular temperature well below the Curie point; and providing to the carrier, concurrently with the magnetizing step, localized and locally variable heating, maximum local heating increasing the temperature of the particles up to the particular temperature, the probability of alignment of magnetization by spontaneous switching to an axis closest to the direction of said field increasing with temperature.

References Cited

UNITED STATES PATENTS

| | | | |
|---|---|---|---|
| 2,857,458 | 10/1958 | Sziklai | 346—74X |
| 3,164,816 | 1/1965 | Chang et al. | 346—74X |
| 3,213,206 | 10/1965 | Zkorykin et al. | 179—100.2 |
| 3,364,496 | 1/1968 | Greiner et al. | 346—74 |

BERNARD KONICK, Primary Examiner

G. M. HOFFMAN, Assistant Examiner

U.S. Cl. X.R.

179—100.2; 250—65